United States Patent
Wang

(10) Patent No.: US 9,436,906 B2
(45) Date of Patent: Sep. 6, 2016

(54) DISCOVERING USER-BEHAVIOR FROM TRAJECTORY-AS-POLYGON (TAP)

(71) Applicant: Ting Wang, Singapore (SG)

(72) Inventor: Ting Wang, Singapore (SG)

(73) Assignee: SAP SE (DE)

( * ) Notice: Subject to any disclaimer, the term of this patent is extended or adjusted under 35 U.S.C. 154(b) by 250 days.

(21) Appl. No.: 14/273,551

(22) Filed: May 9, 2014

(65) Prior Publication Data

US 2015/0324694 A1 Nov. 12, 2015

(51) Int. Cl.
G06F 15/18 (2006.01)
G06N 3/00 (2006.01)
G06N 5/04 (2006.01)
G06N 99/00 (2010.01)

(52) U.S. Cl.
CPC .............. *G06N 3/006* (2013.01); *G06N 5/04* (2013.01); *G06N 99/005* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 6,075,084 A * | 6/2000 | Mabry | ..................... | A01H 5/08 524/495 |
| 6,365,663 B2 * | 4/2002 | Mabry | ................. | B01F 5/0256 524/495 |
| 7,105,595 B2 * | 9/2006 | Mabry | ................. | B01F 5/0256 524/495 |
| 9,304,002 B2 * | 4/2016 | Wang | ..................... | G01C 21/20 |
| 2002/0016404 A1 * | 2/2002 | Mabry | ................. | B01F 5/0256 524/495 |
| 2003/0195276 A1 * | 10/2003 | Mabry | ................. | B01F 5/0256 523/334 |
| 2003/0203992 A1 * | 10/2003 | Mabry | ................. | B01F 5/0256 523/335 |
| 2015/0026142 A1 * | 1/2015 | Wang | ..................... | G01C 21/20 707/693 |
| 2015/0324694 A1 * | 11/2015 | Wang | ................. | G06N 99/005 706/12 |
| 2015/0377626 A1 * | 12/2015 | Wang | ..................... | H04W 4/02 701/519 |
| 2016/0063380 A1 * | 3/2016 | Wang | ..................... | G06N 5/04 706/52 |

OTHER PUBLICATIONS

A sliding-window data aggregation method for super-resolution imaging of live cells Kuan-Chieh Jackie Chen; Yiyi Yu; Jelena Kovacevic; Ge Yang 2015 IEEE 12th International Symposium on Biomedical Imaging (ISBI) Year: 2015 pp. 785-788, DOI: 10.1109/ISBI.2015.7163989 IEEE Conference Publications.*

A support vector machine based technique for online detection of outliers in transient time series Hugo Martins; Luis Palma; Alberto Cardoso; Paulo Gil Control Conference (ASCC), 2015 10th Asian Year: 2015 pp. 1-6, DOI: 10.1109/ASCC.2015.7244794 IEEE Conference Publications.*

Sparse representation of point trajectories for action classification Ravishankar Sivalingam; Guruprasad Somasundaram; Vineet Bhatawadekar; Vassilios Morellas; Nikolaos Papanikolopoulos Robotics and Automation (ICRA), 2012 IEEE Intl. Conf. on Year: 2012 pp. 3601-3606, DOI: 10.1109/ICRA.2012.6224777 IEEE Conference Publications.*

(Continued)

*Primary Examiner* — Michael B Holmes
(74) *Attorney, Agent, or Firm* — Horizon IP Pte. Ltd.

(57) ABSTRACT

Disclosed is a system for analyzing user-behavior using a TaP algorithm. For example, raw data are collected and segmented to become segmented data. In this example, the TaP algorithm in combination with a sliding time window is implemented to derive a convex hull polygon. A determination of geometric properties of the derived convex hull polygon facilitates the analysis of the user-behavior.

20 Claims, 9 Drawing Sheets

(56) References Cited

OTHER PUBLICATIONS

Differentially Private Real-Time Data Release over Infinite Trajectory Streams Yang Cao; Masatoshi Yoshikawa 2015 16th IEEE International Conference on Mobile Data Management Year: 2015, vol. 2 pp. 68-73, DOI: 10.1109/MDM.2015.15 IEEE Conference Publications.*

Sibren Isaacman et al., Human Mobility Modeling at Metropolitan Scales, MobiSys' 12, ACM, 2012, UK.

Cynthia A. Patterson, Challenges in Location-Aware Computing, IEEE, 2003, vol. 2, No. 2.

Ting Wang, An Online Data Compression Algorithm for Trajectories, International Journal of Information and Education Technology, Aug. 2013, pp. 480-487, vol. 3, No. 4.

M. De Berg et al., Computational Geometry, Springer, 2008, pp. 243-252.

Bruce J. Worton, A Convex Hull-Based Estimator of Home-Range Size, Biometrics, Dec. 1995, pp. 1206-1215, vol. 51, No. 4, JStor.

Mahmood Deypir et al., Towards a variable size sliding window model for frequent itemset mining over data streams, Computers & Industrial Engineering, 63, 2012, pp. 161-172, Elsevier Ltd.

R. L. Graham, An Efficient Algorith for Determining the Convex Hull of a Finite Planar Set, Information Processing Letters 1, 1972, pp. 132-133, North-Holland Publishing Company.

David G. Kirkpatrick et al., The Ultimate Planar Convex Hull Algorithm?, SIAM Journal on Computing, 1983.

T. M. Chan, Optimal Output-Sensitive Convex Hull Algorithms in Two and Three Dimensions*, Discrete & Computational Geometry, 1996, pp. 361-368, Springer-Verlag New York Inc.

C. Bradford Barber et al., The Quickhull Algorithm for Convex Hulls, ACM Transactions on Mathematical Software, Dec. 1996, pp. 469-483, vol. 22, No. 4.

David Avis et al., How Good are Convex Hull Algorithms?, Computational Geometry, Feb. 1996, pp. 1-36.

Satya N. Majumdar et al., Random Convex Hulls and Extreme Value Statistics, J Stat Phys Manuscript, 2009, pp. 1-61.

Rosario N. Mantegna et al., Stochastic Process with Ultraslow Convergence to a Gaussian: The Truncated Levy Flight, Physical Review Letters, Nov. 28, 1994, pp. 2946-2949, vol. 73, No. 22.

Richard A. Becker et al., Human Mobility Characterization from Cellular Network Data, Communications of the ACM, 2013, pp. 1-8, USA.

Timothy L. Nyerges, Locational Referencing and Highway Segmentation in a Geographic Information System, ITE Journal, Mar. 1990, pp. 27-31.

N. Andrienko et al., Exploratory Analysis of Spatial and Temporal Data, 2006, Springer Berlin, Germany.

International Transport Forum, Setting the Scene, Improving Reliability on Surface Transport Networks, 2010, pp. 31-33, OECD.

Fosca Giannotti et al., Trajectory Pattern Mining, ACM, 2007, pp. 330-339, USA.

Wei Gao et al., Fine-Grained Mobility Characterization: Steady and Transient State Behaviours, ACM, 2010, pp. 61-70, USA.

F. P. Preparata, Convex Hulls of Finite Sets of Points in Two and Three Dimensions, Communications of the ACM, Feb. 1977, pp. 87-93, vol. 20. No. 2.

Lin Liao et al., Learning and Inferring Transportation Routines, Artificial Intelligence, Feb. 24, 2007, pp. 311-331, vol. 171, Elsevier B.V.

Akinori Asahara et al., Pedestrian-movement Prediction based on Mixed Markov-chain Model, ACM, 2011, pp. 25-33.

* cited by examiner

DISCOVERING USER-BEHAVIOR FROM TRAJECTORY-AS-POLYGON (TAP)

TECHNICAL FIELD

The present disclosure relates generally to intelligent tools. In particular, an intelligent tool includes a system that utilizes Trajectory-as-Polygon (TaP) to analyze user-behavior.

BACKGROUND

Locational data has been pervasive in our daily lives and in scientific research. Generally, locational data involves massive amount of data. In fact, locational data is generally in "Big Data" regime. Locational data is required to obtain details of a moving object, including its trace, velocity and even acceleration. However, the massive amount of data involved with locational data places a heavy burden on analyzing the data. For example, analyzing such large amount of data requires significant amount of time and processing power. In addition, real time analytics of locational data further increases this burden.

From the foregoing discussion, it is desirable to provide effective and efficient processing of massive amount of data, such as locational data. Furthermore, it is desirable to perform efficient analysis of the locational data even if source data is inaccurate or inconsistent.

SUMMARY

A framework for discovering user-behavior using Trajectory-as-Polygon (TaP) is described herein. In accordance with one aspect of the framework, a system collects raw data that includes locational data points of a user or object within a particular time period. The collected raw data is transformed into trajectory data and thereafter, segmenting is performed on the trajectory data based on a sliding time window. A TaP algorithm in combination with the sliding time window is then implemented to derive a convex hull polygon.

In some implementations, geometric properties of the derived convex hull polygon are determined. The geometric properties may be related to the user-behavior such as, for example, the user or object's movement patterns, mobility, etc.

With these and other advantages and features that will become hereinafter apparent, further information may be obtained by reference to the following detailed description and appended claims, and to the figures attached hereto.

BRIEF DESCRIPTION OF THE DRAWINGS

Some implementations are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A method of discovering user-behavior using a Trajectory-as-Polygon (TaP) is described herein. For example, a system collects raw data that includes locational data points of a user or object within a particular time period. In this example, a trajectory data may represent the collected raw data by connecting a trajectory line between the locational data points based on a time sequence of their collection. With the trajectory data, segmenting is performed on the trajectory data based on a sliding time window. A TaP algorithm in combination with the sliding time window is then implemented to derive a convex hull polygon.

In some implementations, geometric properties of the derived convex hull polygon are determined. The geometric properties may be related to the user-behavior such as, for example, the user or object's movement patterns, mobility, etc.

Figure 1:
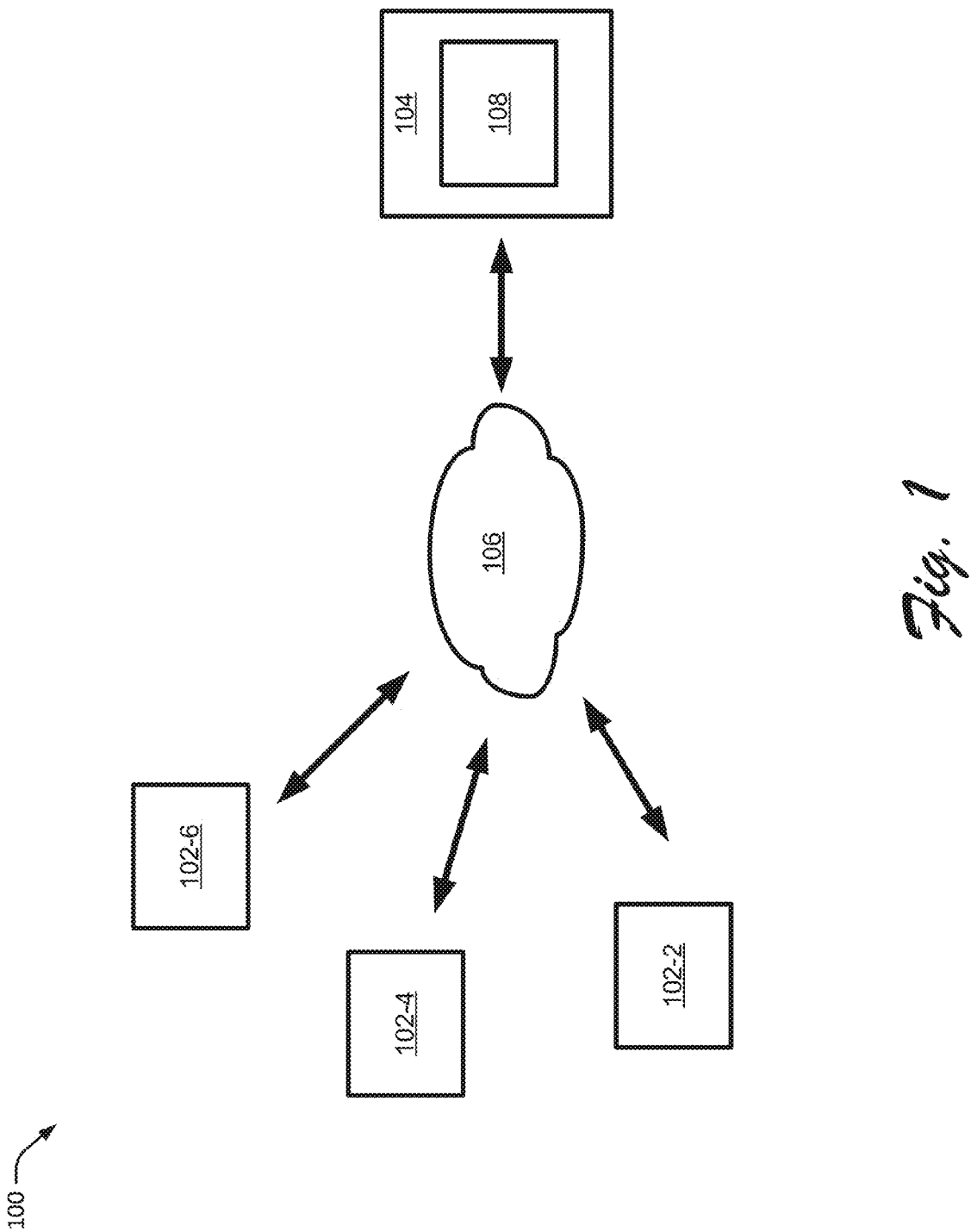
FIG. 1 shows an exemplary environment.

FIG. 1 shows a block diagram of an exemplary environment 100. The environment 100, for example, illustrates sources of raw data and transformation of the raw data for purposes of discovering user or object behavior.

The environment 100 may have a client/server architecture such as, for example, a distributed client/server architecture. In one implementation, the environment 100 includes one or more clients 102 and a server 104 communicatively coupled via a communication network 106. The clients 102 may access the server 104 to store information and/or retrieve information maintained on the server 104. Furthermore, the server 104 may facilitate communication between the clients 102.

The communication network 106, for example, may be a local area network (LAN) which interconnects different devices, such as the clients 102 and the server 104. Other types of networks may also be implemented.

In an implementation, the server 104 may be a computing device configured to transmit, receive, process and store information such as the trajectory data (or locational data points) associated with the environment. For example, the server 104 includes a signal collection system 108 that collects spatial-temporal trajectory data. In this example, the signal collection system 108 may be a GPS tracking system, an automatic identification system (AIS), etc., which is used to track the locational data points of the clients 102 in time and spatial domains. The client's trajectory data may further be related to moving objects, such as people, vehicles (including cars, buses, trucks, trains, planes or ships), goods or components.

In some implementations, the signal collection system 108 may collect the trajectory data of a plurality of moving objects (e.g., clients 102). Different objects may be differentiated by, for example, an object identifier (ID). Furthermore, the signal collection system 108 may collect the trajectory data for a plurality of moving objects of a plurality of types of moving objects. For example, the signal collection system 108 may collect trajectory data of different types of moving objects.

With continuing reference to FIG. 1, the server 104 may implement, for example, a TaP algorithm on the trajectory data for trajectory mining and behavioral study purposes. For example, the behavioral study may include a process in which information related to user or object's behaviors such as lifestyles, home location, travel locations, etc., may be discovered. In this example, the TaP algorithm may utilize a polygon (not shown) to represent an object's trajectory, instead of using line segments. The polygon and particularly its geometric properties (e.g., location, size, shape, and number of vertices/edges etc.) may be utilized to observe and determine mobility patterns and user behavior.

Furthermore, implementation of the TaP algorithm may also be applied to treat and represent the locational data points; and to discover information and extract knowledge—regardless of the quality and density of the collected locational data points (i.e., source data). For example, as further discussed below, a person's lifestyle patterns may be extracted, classified and clustered using the TaP algorithm even when the source data is scarce and largely inaccurate. In this example, the present implementations provide the mobility patterns and the user behavior regardless of whether some of the locational data points are missing due to noise corruption, transmission failure, etc.

In an implementation, the client 102 may be a local or remote computing device with, for example, a local memory and a processor. For example, the client 102 may be a PC, tablet PC, workstation, network computer, kiosk or personal data assistant (PDA).

Although the environment 100 is shown to include a limited number of clients 102 and one server 104, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as an email system. Any user may access the user's respective account from any client by performing an authentication or a login process, such as providing a user name and password.

Figure 2:
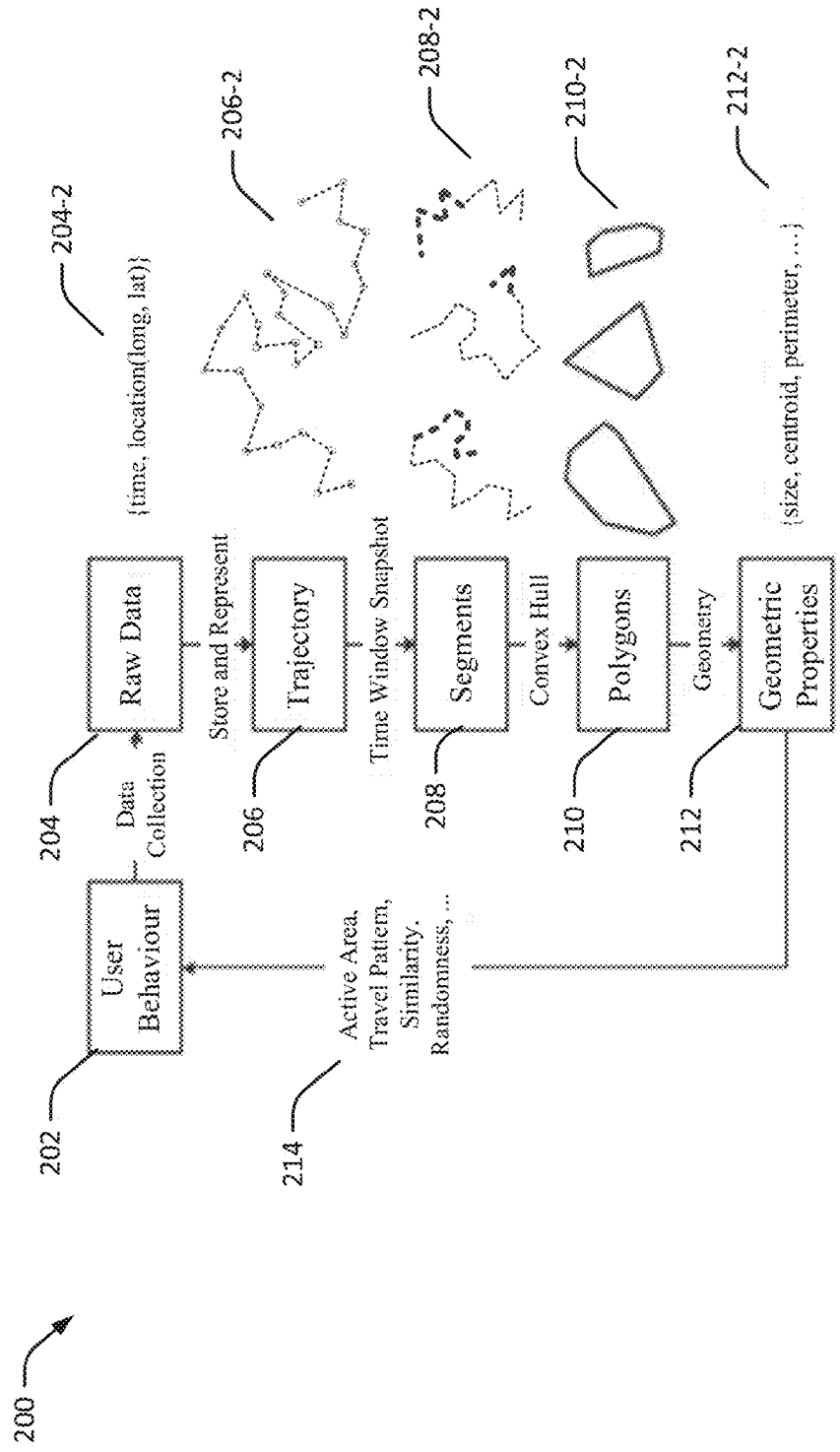
FIG. 2 shows an exemplary overview of a high-level data flow of a TaP algorithm.

FIG. 2 shows an example overview 200 that illustrates a high-level overall data flow of the TaP algorithm as described in the present implementations herein. The overview 200 shows a user behavior 202, raw data 204, trajectory 206, segments 208, polygons 210, geometric properties 212, and resulting analysis 214. Furthermore, the overview 200 shows raw data elements 204-2, trajectory results 206-2, segmented data results 208-2, derived polygons 210-2 and geometric properties elements 212-2.

In an implementation, the user behavior 202 may include movements of the user or an object within a particular time period. For example, the particular time period is sixty (60) minutes. Within the 60 minutes period, the raw data 204 stores multiple locational data points that are collected and defined in spatial and time domains. The spatial and time domains are shown in the raw data elements 204-2 as a function of time, longitude, and/or latitude.

With the locational data points stored in the raw data 204, the trajectory 206 may implement an algorithm to connect one locational data point to another locational data point based on their time of measurements. For example, within the 60 minutes period, the trajectory 206 may place imaginary connection line between successive locational data points. In this example, the imaginary connection line outlines the behavior of the locational data points within the example 60 minutes period. The imaginary connection line may follow the time sequence or period in which the locational data points are collected.

At the segments 208, the locational data points are clustered into different segments (i.e., segmented data results 208-2) based on a sliding time window or a time window snapshot. For example, if the time window snapshot has a size of one minute, then the segments 208 may include sixty separate and independent segments in the example 60 minutes time period above. Within this window snapshot of one minute, the density of locational data points may vary. In other words, the number of the locational data points in the first minute may double that of the second minute in the example 60 minutes time period.

At the polygon 210, a convex hull algorithm in combination with the sliding time window may be implemented on the segmented or clustered locational data points to generate the corresponding convex hull polygons as shown in the derived polygons 210-2. The derived polygons 210-2 may include different types of polygons depending upon the spatial location of the locational data points within the time window snapshot. For example, the first segment in the segmented data results 208-2 is based from 20 locational data points. With the application of the convex hull algorithm, a small 7-sided first polygon as shown in the derived polygons 210-2 is generated. In this example, the perimeter of the 7-sided first polygon has 7 vertices, and the perimeter contains or covers the rest of the 13 locational data points from the 20-locational data points of the first segment.

In another example, the second segment in the segmented data results 208-2 is based from 10 locational data points. In this example, the application of the convex hull algorithm may generate a 4-sided second polygon (i.e., 4 vertices) as shown in the second polygon of the derived polygons 210-2. The perimeter of the 4-sided second polygon may again define a perimeter that contains the rest of the 6 locational data points. In other words, complete collection or perfect transmission of all locational data points may not be required to generate the analysis of the user behavior pattern in the present implementation.

At the geometric properties 212, the size, centroid, perimeters, etc. (i.e., geometric properties elements 212-2) of the generated convex hull polygons in the derived polygons 210-2 are analyzed. For example, these parameters are utilized to determine the active area, travel pattern, similarity, and randomness of the user movements as shown in the resulting analysis 214. The active area, travel pattern, similarity, and randomness are further discussed below.

Figure 3:
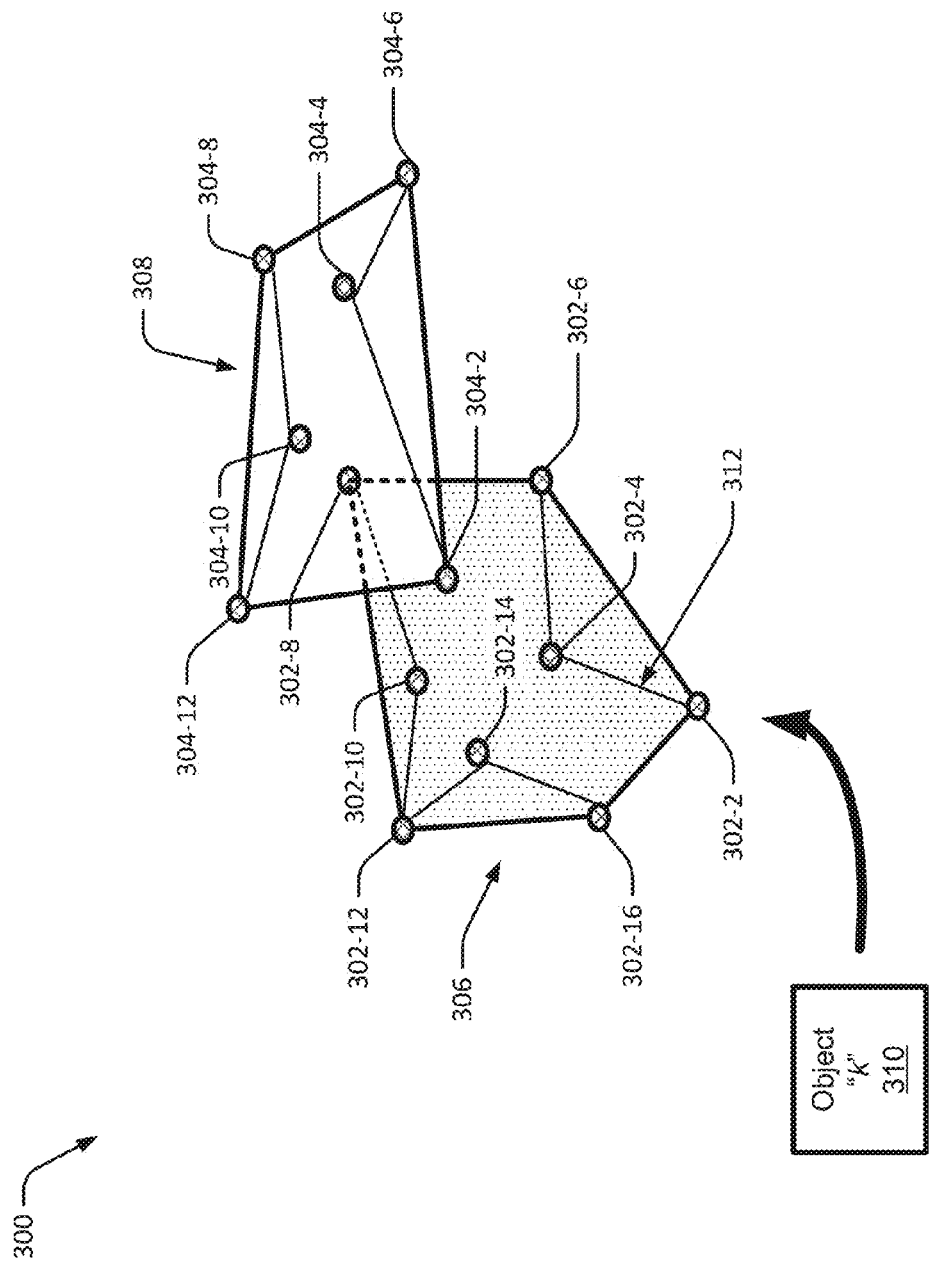
FIG. 3 shows exemplary derived polygons as described in the implementation herein.

FIG. 3 shows an example of derived polygons 300 as described in the present implementations herein. The derived polygons 300, for example, are generated by the polygons 210 in FIG. 2. In this example, the derived polygons 300 facilitate the determination of movements or behavior of the user or object at different time periods.

The example derived polygons 300 illustrates a first set of locational data points 302 and a second set of locational data points 304 that correspond to a first convex hull polygon 306 and a second convex hull polygon 308, respectively. Furthermore, the first set of locational data points 302 are collected within a first time window (t1+τ) while the second set of locational data points 304 are collected within a subsequent second time window (t2+τ) where "τ" stands for a time window or sliding time window size. For example, the "τ" may be of constant value or dynamically adjusted in the TaP algorithm implementation. In this example, the time windows (t1+τ) and (t2+τ) are the time window snapshots for the segmented data results 208-2 as described in FIG. 2.

In an implementation, the trajectory of the locational data points 302 and 304 in the derived polygons 300 may include spatial-temporal data. In this implementation, the spatial information may be 2-dimensional (2-D) spatial information (i.e., include longitude and latitude values). The spatial information alternatively may be 3-dimensional (3-D) spatial information. For example, spatial information may include longitude, latitude and altitude information. Three-dimensional spatial information is particularly useful for tracking movements of, for example, planes. Other configurations of spatial information may also be useful. The spatial information, along with the temporal information, such as a timestamp, can track the movement or trajectory of an object 310 or client 102. For example, trajectory mining techniques may be utilized to track this movement or trajectory.

Tracking the movement or trajectory of the object 310 may utilize other trajectory mining techniques, which are further classified into state-based, similarity-based, or density-based. While pervasive positioning technologies give opportunities to access vast amount of locational data and test these solution, challenges due to sparse nature of data collection strategies, diverse density of the data, and technical issues associated with the accuracy of the data may arise. For example, if the data points are scarce (either spatially or temporally), the similarity-based solution may produce inaccurate results, because data points for similar trajectories may be far apart. On the other hand, for high frequency locational data (e.g., continuously generated by positioning sensors), the state-based approach may be overwhelmed by the enormous number of states. Although a compression algorithm may be needed to pre-process the data, the result may be inefficient. Furthermore, the density-based solutions may need the timely frequency of data points to be normalized; otherwise their density would not reflect the true distribution of the moving objects.

With the above outlined inconsistencies in the three major classifications of the trajectory mining techniques, the implementation of the TaP algorithm in combination with the sliding time window may overcome the above deficiencies. For example, the TaP algorithm implements the convex hull algorithm to derive the polygon that is used to analyze a person's lifestyle without collecting or knowing all of his or her movements.

In an implementation, the convex hull is of a set of locational points in the Euclidean plane or Euclidean space which is the smallest convex set that contains the set of locational points. The TaP algorithm may utilize the convex hull and apply this to human mobility scenario such as the determination of the human's social behavior. More importantly, the sliding time window with variable size (i.e., window size "τ") may be added to the TaP algorithm, so that the timely change of the convex hull polygons 306 or 308 may be studied, and the user behavior patterns may thus be observed.

With continuing reference to FIG. 3, the TaP algorithm implementation takes the raw position data of the object with the user identifier (UID) k 310 as input. The raw position data includes the sets of locational data points 302 and 304. Furthermore, the trajectory 206 in FIG. 2 may connect the raw data through an imaginary trajectory line 312 based on the stored data collection time domain. For example, the trajectory line 312 connects the locational data point 302-2 to 302-4, and from the locational data point 302-4, the trajectory line 312 connects the 302-4 to 302-6, etc. until the trajectory line 312 ends at locational data point 304-12, which may be the locational data point collected at the end of second time window (t2+τ).

Upon implementation of the convex hull algorithm, a convex hull polygon 306 is derived on the first set of locational data points 302. Although there are 8 locational data points in the first set of locational data points 302, a resulting 5-sided convex hull polygon 306 may utilize 5 of the 8 locational data points as its vertices. That is, the locational data points 302-4, 302-10 and 302-14 are within the set of the convex hull polygon 306 and as such, they were not utilized to define the convex hull polygon 306.

With regard to the second convex hull polygon 308, the same procedure may be implemented by the convex hull algorithm. This time, the second convex hull polygon 308 includes the second set of locational data points 304 that were collected during a second time window (t2+τ). For example, the convex hull polygon 308 is defined by the locational data point 304-2 as a starting point at time "t2," then the locational data point 304-2 is connected to vertices 304-6, 304-8, and 304-12 of the convex hull polygon 308. Note that the locational data points 304-4 and 304-10 were not included to define the vertices of the convex hull polygon 308 because these locational data points lie within the set of the convex hull polygon 308. In other words, even though other locational data points within the convex hull polygon 308 are not utilized, the accuracy of the TaP algorithm implementation may still be maintained at substantially high level.

In an implementation, the geometric properties of the derived polygons 300 for different objects k are denoted as a function of k, t and τ, and written as:

$$P(k,t,\tau)=\{\text{geometric properties of } P\}.$$

As further described below, the geometric properties P may facilitate analysis of the derived polygons 300. For example, a distance between two locational data points 302-2 and 302-4 may be computed and compared to another distance between the locational data points 302-4 and 302-6. In this example, if the computed average distances in the first set of locational data points 302 may picture that of a person in a building (e.g., average distances of 50 feet), then it may be concluded that the person has been staying at the office or his house at a particular time period.

In another example, where the object is a car and the average computed distances in the same set of locational data points 302 may picture that of the car travelling around a city (e.g., average distances of 1 mile), then it may be concluded that the car has been travelling within the area described by the set of locational data points 302.

In the examples above, the TaP algorithm implementation may facilitate learning of the person's lifestyle or the car's routine at a particular period of time without sacrificing confidentiality factor in the process. For example, the user or person may not want themselves to be "pin-pointed" by their location history. With the TaP implementation, the person's lifestyle may be observed without knowing exactly where the person has been travelling.

Figure 4:
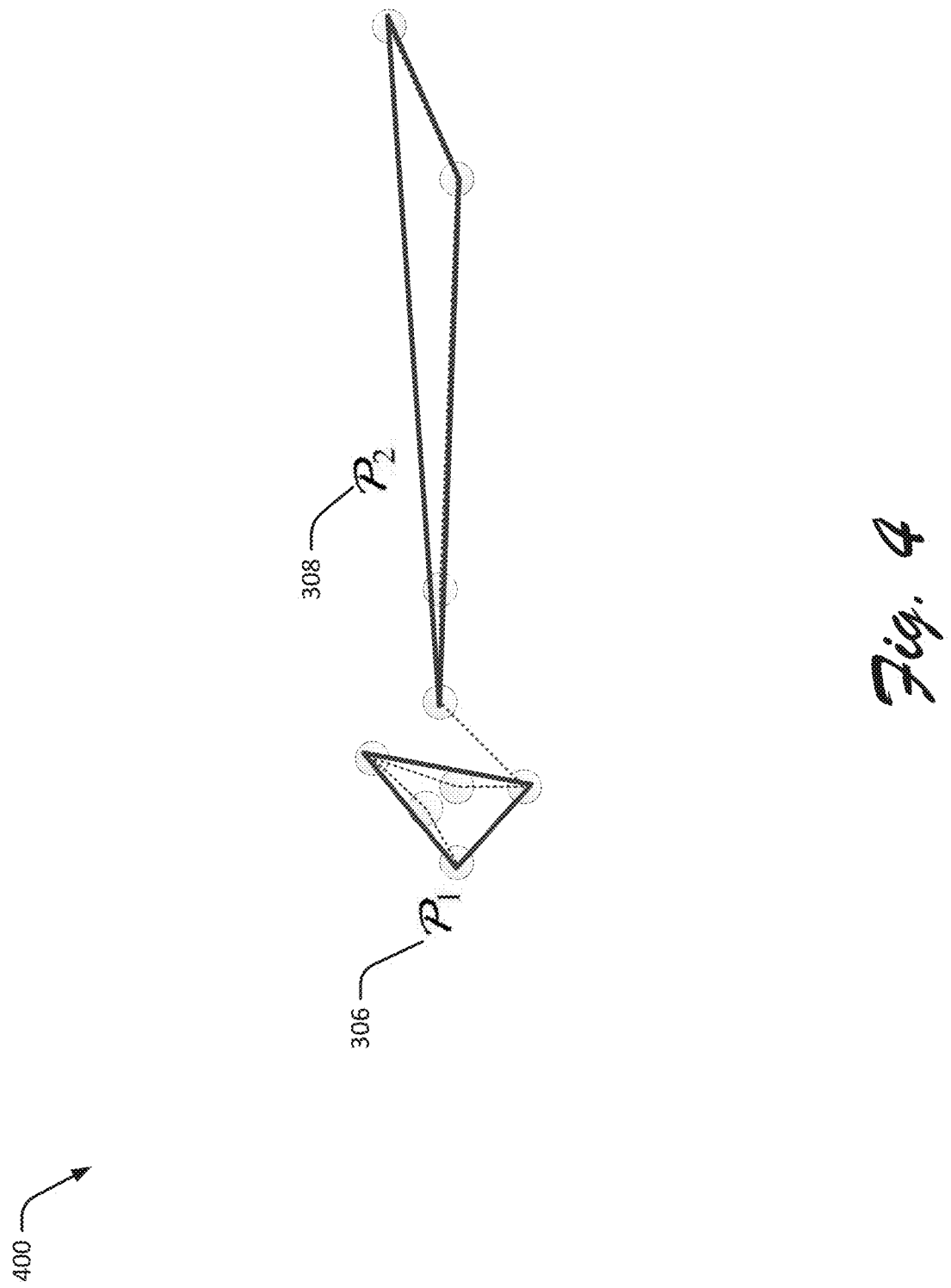
FIG. 4 shows another exemplary derived polygons as described in the implementation herein.

FIG. 4 shows another example of derived polygons 400 with different geometrical sizes. For example, the convex hull polygons 306 and 308 of the derived polygons 400 are shown to have different geometrical sizes as compared to the same polygons in the derived polygons 300 that were illustrated in FIG. 3.

In analyzing geometrical properties P of the derived polygons, one element of the resulting analysis 214 in FIG. 2 includes understanding of an active area of the object such as, for example, where the person stops and stays in the same vicinity or area for a particular time period. In this example, the active area would reflect where the person lives, works or does shopping.

With the other trajectory mining algorithms, the active area includes the places with denser locational records (e.g., high density locational data points). However, the effectiveness of these trajectory mining algorithm solutions may hugely depend on the source locational data quality. That is, if the object does not sense its locational data points frequently, then there would not be a clear difference in signal density between the active area and the non-active area. Moreover, it may be difficult to find out the boundary of the active area from the signal density.

In the current TaP algorithm implementation, the trajectory data is represented by the derived polygons 306 and 308 that corresponds to separate time window snapshots. Because the sliding time window "τ" has a constant size, smaller derived polygons 306 or 308 may indicate that the object spent the same amount of time within a smaller area. In an implementation, the smaller area is a good indication that the derived polygon (e.g., convex hull polygon 306) may include the active area.

In a case where a similar area is also defined such as by the concave hull polygon 308, another parameter of the geometric properties P may be considered during the analysis. For example, the other parameter involves an edge length variation/deviation, total perimeter, and number of edges of the concave hull polygon 308. As shown in FIG. 4, the concave hull polygon 308 has fewer edges, longer edge length deviation, and greater perimeter as compared to the concave hull polygon 306. As such, the concave hull polygon 308 may be analyzed to define a non-active area despite having the same area as the concave hull polygon 306. In an implementation, separate threshold measurements are implemented on the geometric properties P in order to arrive on the analysis above.

In another example, the concave hull polygon 308 defines a zero size (not shown). That is, about one or two locational data points (i.e., records) may be found in a single time window. With this geometric properties P of the concave hull polygon 308, the same may be considered to define non-active area. In this set-up, the TaP algorithm implementation may dynamically adjust the time window size so that more locational data points are collected in the single time window and a better conclusion may be drawn.

Figure 5:
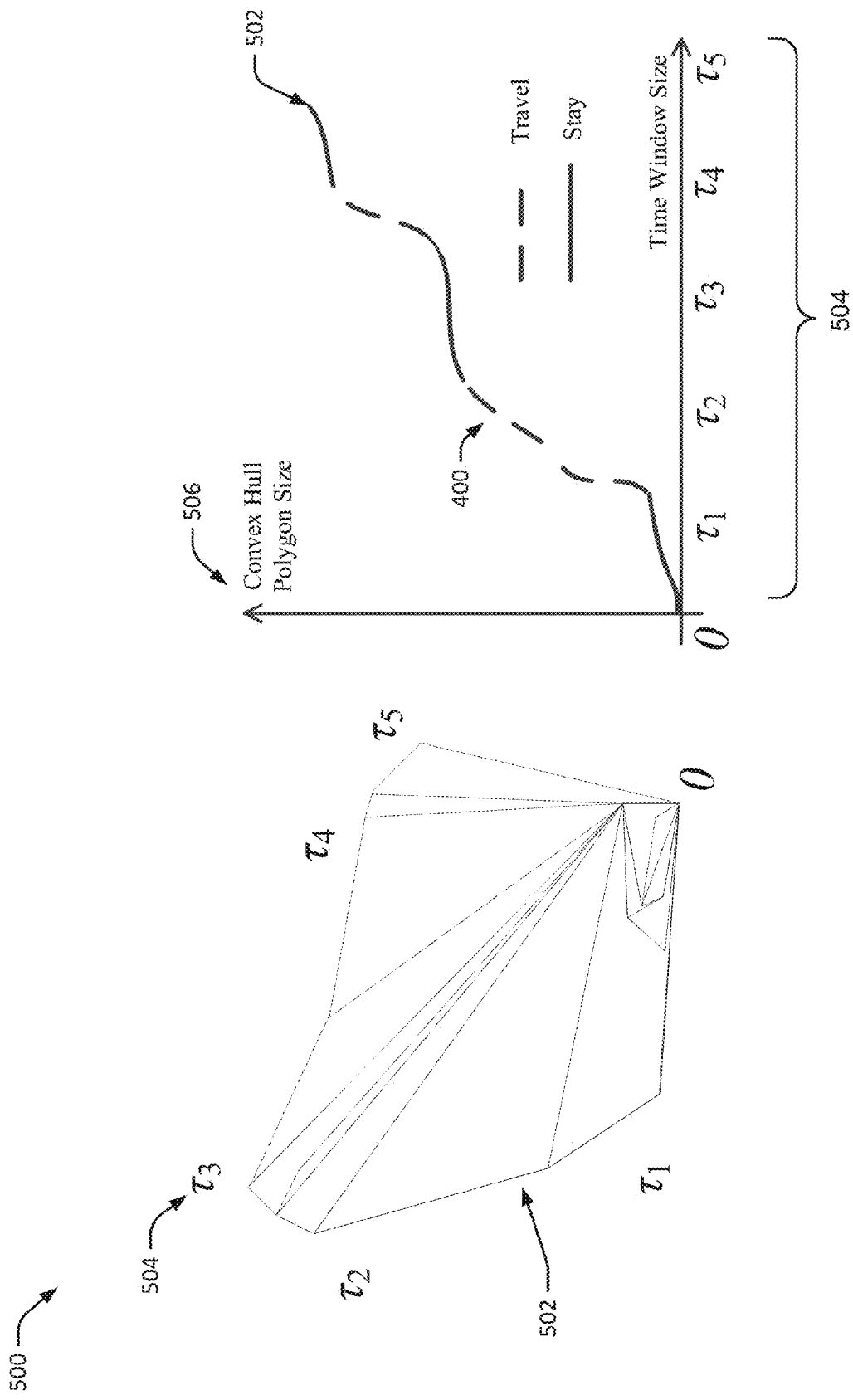
FIGS. 5-7 show exemplary geometrical analysis diagrams as described in the implementation herein.

FIG. 5 shows an example geometrical analysis diagram 500 as described in the present implementations herein. For example, the geometrical analysis diagram 500 is utilized to observe mobility of the user or object. As shown, the example geometrical analysis diagram 500 illustrates a sequence of derived polygons 502 across different sliding time windows 504. Furthermore, the geometrical analysis diagram 500 shows convex hull polygon sizes 506 corresponding to the derived polygons 502.

In an implementation, the convex hull polygon sizes in the sequence of derived polygons 502 may vary in sizes. As such, each convex hull polygon may describe the object to be travelling or not travelling (i.e., staying) during a particular time period or time window snapshot. For the object to be travelling, the convex hull polygon may be analyzed as to its geometric properties P as described below.

Firstly, convex hull polygons with a smaller size, longer perimeter and a large edge length variation may be analyzed and concluded, for example, to be a traveling object. The reason being, the long edge of the convex hull polygon may show that the object is traveling during the time window snapshot as opposed to the shorter edges which may give the information about the destination and starting point of the traveling object.

Secondly, convex hull polygons with large size may be a good indication, for example, that the object is traveling. With the large active area, the object may be analyzed to go multiple places within the time window snapshot.

With continuing reference to FIG. 5, a convex hull polygon size threshold may be configured in order to determine whether the particular derived polygon suggests the object to be travelling or not. For example, as shown, the object is travelling during a first time window "0 to τ1" because the size of the derived polygon is greater than the configured size threshold (not shown). In another example, the same object is shown to be staying at second time window "τ1 to τ2" because the size of the second derived polygon is lesser than the configured size threshold.

In FIG. 5, the sliding time window 504 has a time interval defined [t, t+τ). The sliding time window 504 as applied to mobility observation may usually span throughout days or even months. To make sense of the data, a smaller time window, with less data, may facilitate meaningful and simplicity in analyzing of data.

Furthermore, the value of the time window snapshot τ of the sliding time window 504 may not change, which gives a series of constant length time windows. Moreover, the time window snapshot needs to "slide" forward as time evolves. Since the trajectory data is spatial-temporal, the sliding time windows may facilitate analysis of the "temporal" property of the derived polygons. That is, a single time window snapshot may show static location of the object in the particular time interval, while a series of sliding time windows demonstrate how the object is moving around over time. In this implementation, the i continuous sliding time windows is denoted as:

$$\{[t_1, t_1+\tau), [t_2, t_2+\tau), \ldots, [t_i, t_i+\tau), \ldots\}.$$

For convenience of discussion, it is usually by default that the amount of the sliding window advances is represented by:

$$t_\Delta = t_2 - t_1 = t_k - t_{k-1} \text{ is a constant.}$$

To avoid loss of information, there is a need to implement $t_\Delta < \tau$, otherwise the trajectory data between two consecutive time windows may not be able to be captured. In particular, an overlapping sliding time window setup may be concluded if $t_\Delta < \tau$, and a non-overlapping setup if $t_\Delta = \tau$. Overlapping means redundancy in the data to be analyzed. This may result in larger data size and more processing time, but the same may facilitate a smoothing technique and able to avoid sudden "jump" between the time windows. In an implementation, the $t_\Delta \approx \frac{1}{3}\tau$ value may give a smooth transition among the time windows.

Figure 6:
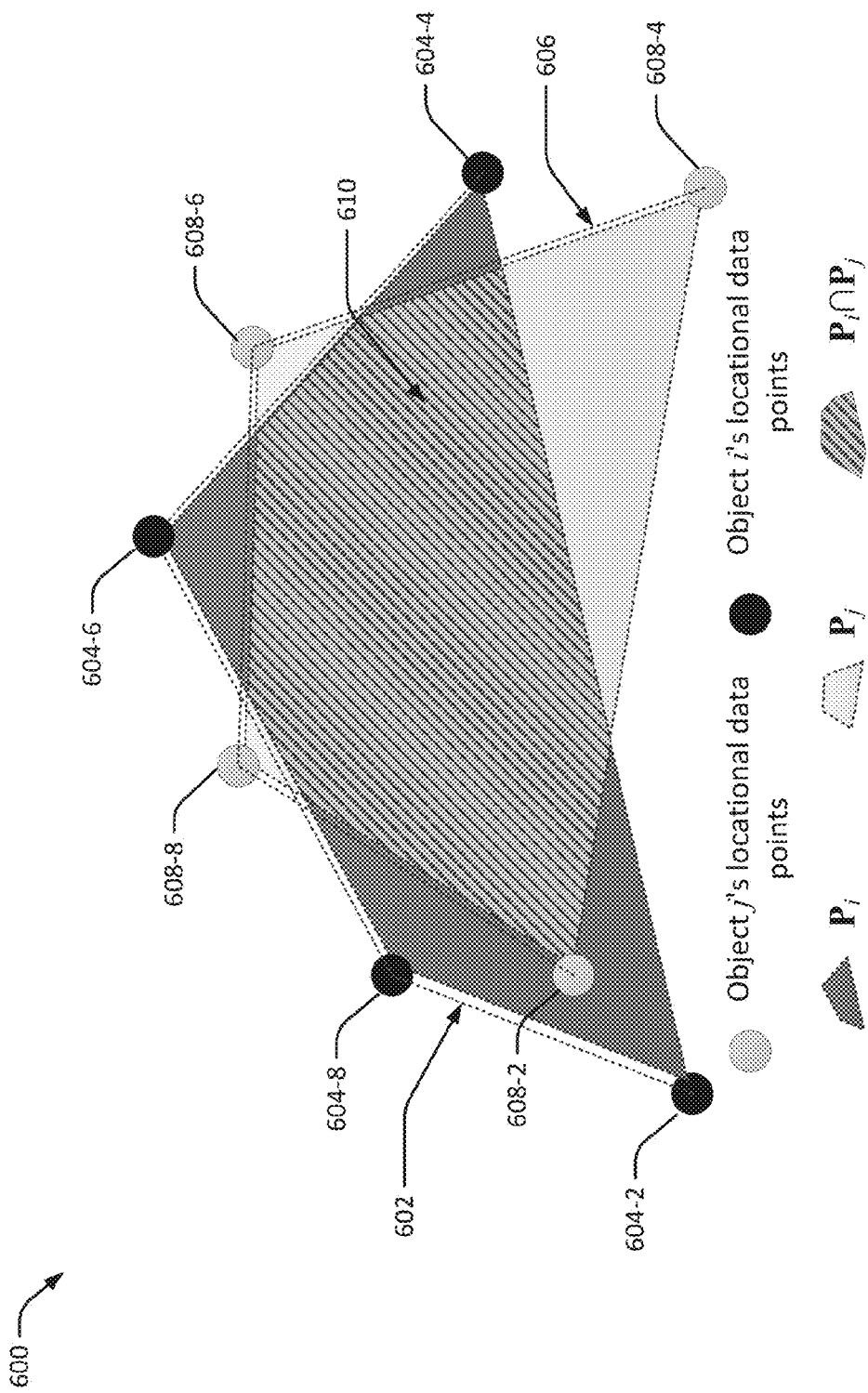

FIG. 6 shows an example geometrical analysis diagram 600 as described in the present implementations herein. For example, the geometrical analysis diagram 600 is utilized to observe similarity in trajectory between two different objects. As shown, the example geometrical analysis diagram 600 illustrates a first object "i" with a convex hull polygon 602 that is defined by locational data points 604. Furthermore, the geometrical analysis diagram 600 shows a second object "j" with a convex hull polygon 606 that is defined by locational data points 608. An overlapping area 610 defines the extent of commonality between the convex hull polygons 602 and 606 within a particular time window.

As shown, the locational data points of the moving objects "i" and "j" may be clustered by their trajectory similarity. With the trajectory mining algorithm, the similarity is measured by the closeness of the locational data points. However, because of the signal quality and particularly, during the data collection, this solution may be less effective than it sounds.

In the implementation described herein, the TaP algorithm may convert the clustered trajectories of the objects "i" and "j" into convex hull polygons 602 and 606, respectively. In this implementation, the similarity may be estimated by the overlapping area size of their respective polygons. For example, the overlapping area 610 defines the extent of similarity between the two resulting convex hull polygons 602 and 606. Quantitatively, a similarity index S may be measured as the size of the overlapping area 610 divided by the total area covered by the two resulting convex hull polygons 602 and 606, and written as:

$$S = \frac{A_{P_1 \cap P_2}}{A_{P_1 \cup P_2}}$$

where A denotes the area size of the polygon. A value of S close to 1 will indicate the given polygons are similar to each other. It should be noted that the measure of similarity index can be easily extended to multiple objects by comparing polygon sizes of the same time window across different ID's.

Thus, when the objects "i" and "j" have convex hull polygons with high similarity index over several consecutive time windows, the index may be a good indication that these two objects travel in similar pattern.

Figure 7:
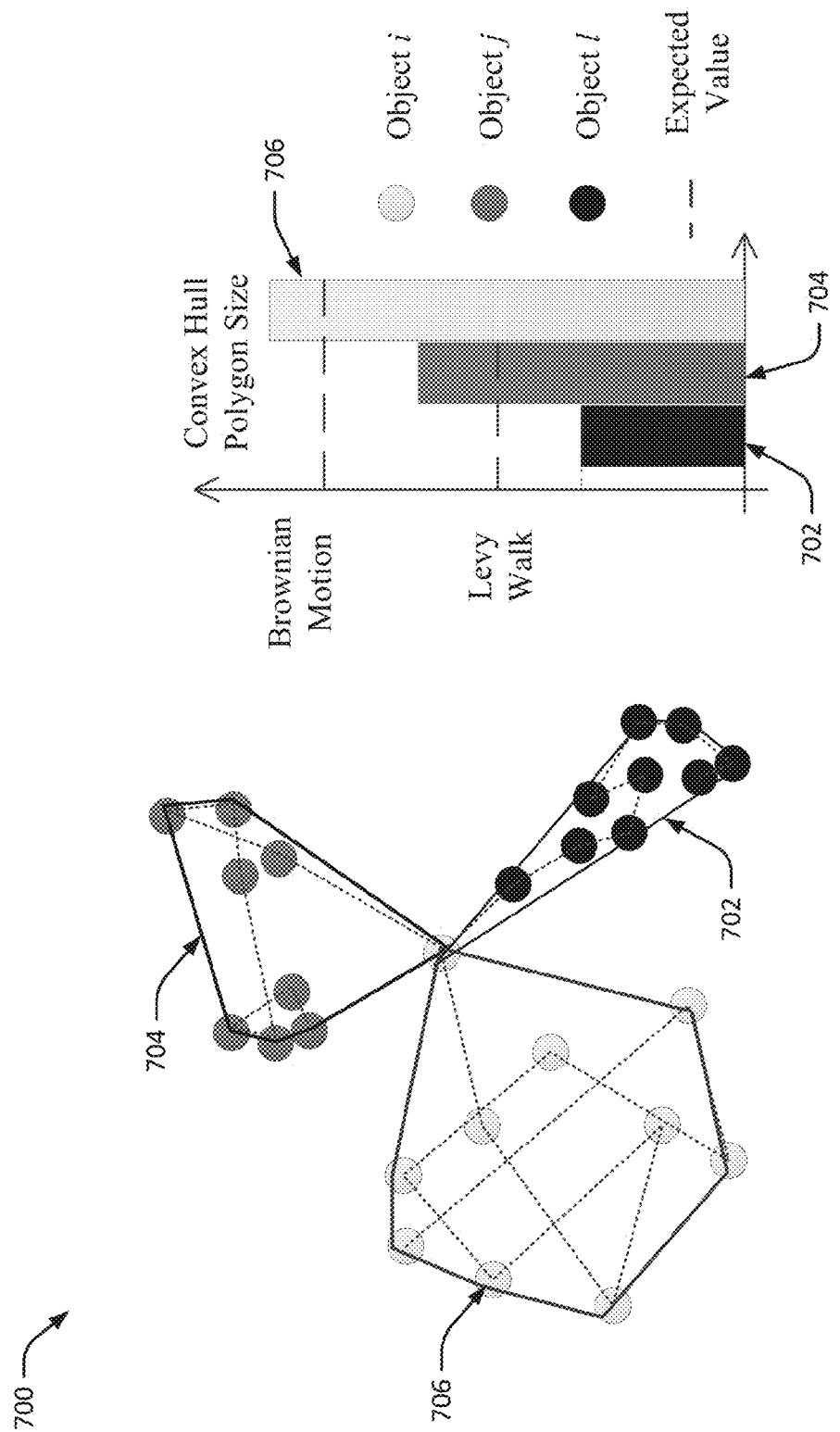

FIG. 7 shows an example geometrical analysis diagram 700 as described in the present implementations herein. For example, the geometrical analysis diagram 700 is utilized to observe randomness in the trajectory of the object at different time windows. As shown, the example geometrical analysis diagram 700 illustrates the objects "i," "j," and "l" with convex hull polygons 702, 704, and 706 at different time windows.

In an implementation, non-random movements of the object may indicate certain behavior as reflected by the mobility pattern. For example, an intention of a criminal suspect (i.e., object) may be derived from the randomness of his movements within a particular period of time before the criminal act was committed. To this end, the geometric property of the convex hull polygons 702, 704, and 708 may indicate the degree of randomness.

For example, the locational data points within the convex hull polygon is a function of time and speed. In this example, the estimate speed of the object may be calculated and a theoretic value for the convex hull size is determined assuming the object is moving in certain mobility model. This theoretic value may serve as a benchmark or a threshold. For example, by comparing the real convex hull polygon sizes with this benchmark, an evaluation of the object's moving pattern may be compared to the model—as the assumption. Typically, a purposeful movement may result in smaller convex hull polygon size.

With continuing reference to FIG. 7, the movements in the convex hull polygons 702 and 704 show a lesser degree of randomness as compared to the convex hull polygon 706. That is, the movements in the convex hull polygons 702 and 704 show lesser focus of locational data points within a lesser area and as such, they show a lesser degree of randomness as compared to the convex hull polygon 706. The convex hull polygon 706 includes a greater active area with fewer locational data points.

Thus, with the application of the sliding time window, and convex hull algorithm to convert objects' trajectories into a series of polygons, the TaP algorithm may show the trajectory properties that may be extracted from the geometric properties of the polygons. These trajectory properties may indicate the movement patterns of the objects and this solution tolerates errors such as signal inaccuracy and varying frequency, while preserving users' private information.

Figure 8:
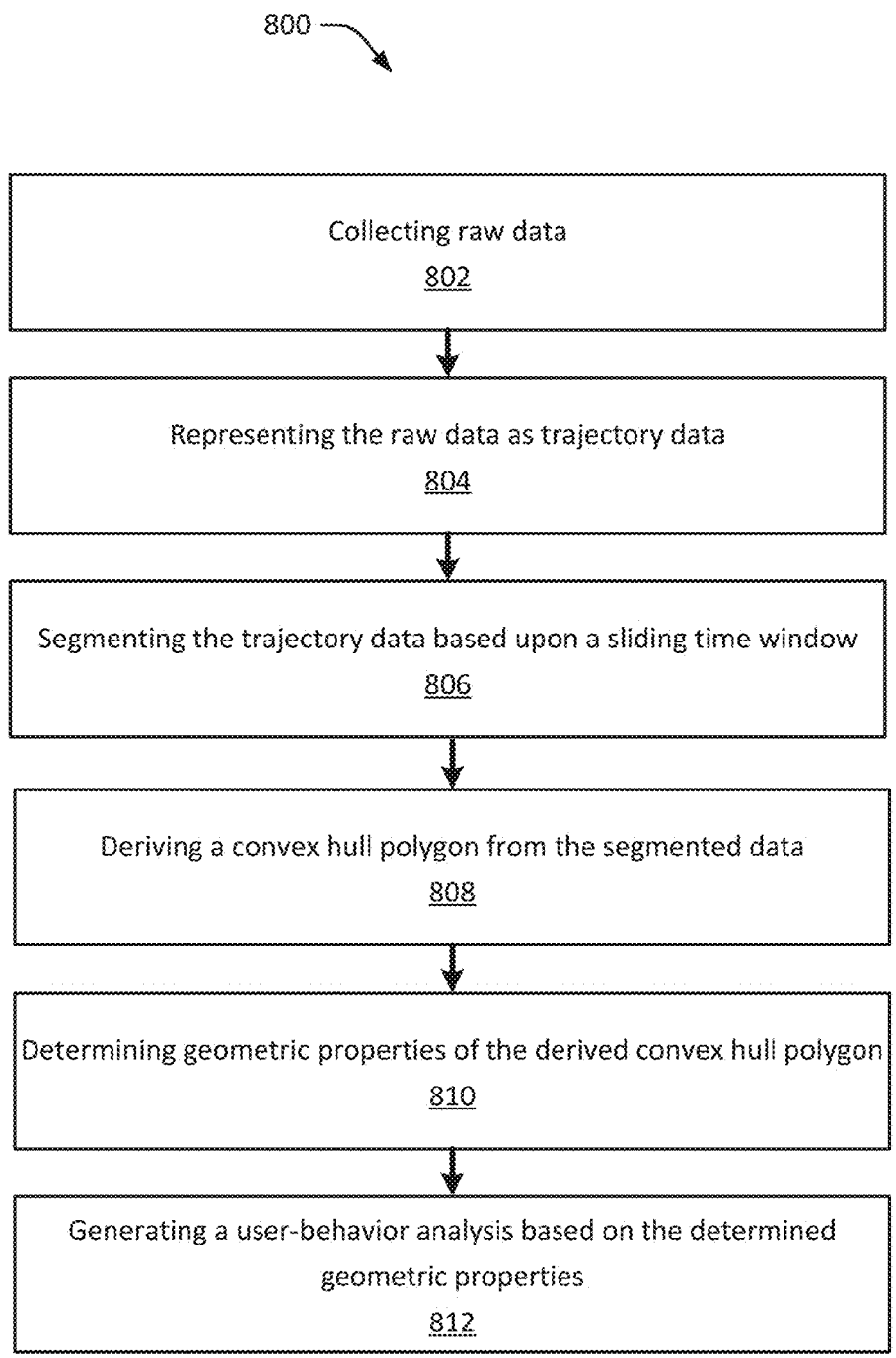
FIG. 8 shows an exemplary process for implementing, at least in part, the technology described herein.

FIG. 8 illustrates an exemplary process 800 for implementing, at least in part, the technology described herein. In particular, process 800 depicts a flow that implements TaP algorithm for observing user-behavior. The process 800 may be performed by a computing device or devices. An example architecture of such a computer device is described below with reference to FIG. 9. In this particular example, the process 800 describes that certain acts are to be performed at or by a user or a system.

At 802, collecting raw data is performed. For example, the raw data include locational data points such as the locational data points 302. The locational data points 302 are spatial-temporal locational data points.

At 804, representing the raw data as trajectory data is performed. For example, the representing includes connecting a trajectory line between the locational data points 302 based on a time sequence of each locational data point. In other words, the trajectory line may connect the first-in-time locational data point to an immediate next-in-time locational data point.

At 806, segmenting the trajectory data based upon a sliding time window is performed. For example, the segmenting of the trajectory data may cluster the trajectory data into different segments corresponding to each time window in the sliding time window. In this example, the each time window corresponds to a variable window size "τ" of the sliding time window.

At 808, deriving a convex hull polygon based upon the segmented data is performed. For example, the deriving of the convex hull polygon 306 is implemented through a convex hull algorithm in combination with the sliding time window.

At 810, determining geometric properties of the derived convex hull polygon is performed. For example, the geometric properties defines an active area, number of edges, edges length or deviation, and vertices of the derived convex hull polygon 306.

In an implementation, a threshold is configured for each of the geometric properties in order to arrive at a certain conclusion. For example, an overlapping threshold is utilized to determine if there is similarity in the travelling pattern between two objects or users who are travelling within the same time window "τ." In this example, the overlapping area between their respective derived convex hull polygons are compared to the overlapping threshold. In another example, a density threshold for a particular active area may be utilized to determine if there is randomness or non-randomness in the movement of the object or user. In this example, the density of the locational data points in the derived convex hull polygon is taken into consideration. That is, as shown in FIG. 7, the movements in the convex hull polygons 702 and 704 with lesser areas and lesser focus of locational data points show a degree of lesser randomness as compared to the convex hull polygon 706. The convex hull polygon 706 includes a greater active area with fewer locational data points.

At 812, in response to the determined geometric properties, generating a user-behavior analysis is performed. For example, the determined geometric properties may facilitate a conclusion that a user or object is travelling or staying at a particular location within the sliding time window.

Figure 9:
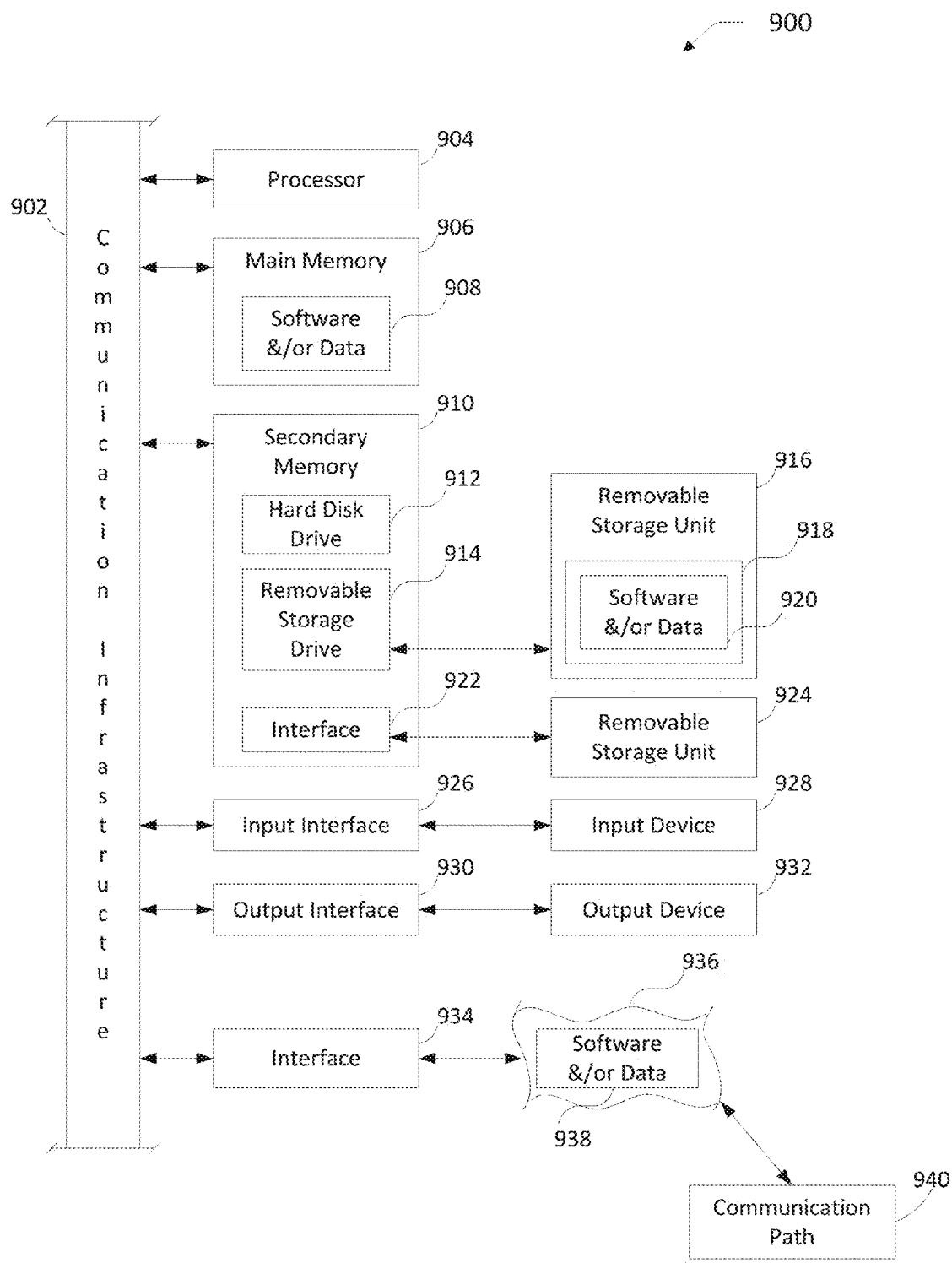
FIG. 9 illustrates an exemplary computing system to implement in accordance with the technologies described herein.

FIG. 9 illustrates an exemplary system 900 that may implement, at least in part, the technologies described herein. The computer system 900 includes one or more processors, such as processor 904. Processor 904 can be a special-purpose processor or a general-purpose processor. Processor 904 is connected to a communication infrastructure 902 (for example, a bus or a network). Depending upon the context, the computer system 900 may also be called a client device.

Computer system 900 also includes a main memory 906, preferably Random Access Memory (RAM), containing possibly inter alia computer software and/or data 908.

Computer system 900 may also include a secondary memory 910. Secondary memory 910 may include, for example, a hard disk drive 912, a removable storage drive 914, a memory stick, etc. A removable storage drive 914 may comprise a floppy disk drive, a magnetic tape drive, an optical disk drive, a flash memory, or the like. A removable storage drive 914 reads from and/or writes to a removable storage unit 916 in a well-known manner. A removable storage unit 916 may comprise a floppy disk, a magnetic tape, an optical disk, etc. which is read by and written to by removable storage drive 914. As will be appreciated by persons skilled in the relevant art(s) removable storage unit 916 includes a computer usable storage medium 918 having stored therein possibly inter alia computer software and/or data 920.

In alternative implementations, secondary memory 910 may include other similar means for allowing computer programs or other instructions to be loaded into computer system 900. Such means may include, for example, a removable storage unit 924 and an interface 922. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 924 and interfaces 922 which allow software and data to be transferred from the removable storage unit 924 to computer system 900.

Computer system 900 may also include an input interface 926 and a range of input devices 928 such as, possibly inter alia, a keyboard, a mouse, etc.

Computer system 900 may also include an output interface 930 and a range of output devices 932 such as, possibly inter alia, a display, one or more speakers, etc.

Computer system 900 may also include a communications interface 934. Communications interface 934 allows software and/or data 938 to be transferred between computer system 900 and external devices. Communications interface 934 may include a modem, a network interface (such as an Ethernet card), a communications port, a Personal Computer Memory Card International Association (PCMCIA) slot and card, or the like. Software and/or data 938 transferred via communications interface 934 are in the form of signals 936 which may be electronic, electromagnetic, optical, or other signals capable of being received by communications 934. These signals 936 are provided to communications interface 934 via a communications path 940. Communications path 940 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 916, removable storage unit 924, and a hard disk installed in hard disk drive 912. Computer program medium and computer usable medium can also refer to memories, such as main memory 906 and secondary memory 910, which can be memory semiconductors (e.g. Dynamic Random Access Memory (DRAM) elements, etc.). These computer program products are means for providing software to computer system 900.

Computer programs (also called computer control logic) are stored in main memory 906 and/or secondary memory 910. Such computer programs, when executed, enable computer system 900 to implement the present technology described herein. In particular, the computer programs, when executed, enable processor 904 to implement the processes of aspects of the above. Accordingly, such computer programs represent controllers of the computer system 900. Where the technology described herein is implemented, at least in part, using software, the software may be stored in a computer program product and loaded into computer system 900 using removable storage drive 914, interface 922, hard disk drive 912 or communications interface 934.

The technology described herein may be implemented as computer program products comprising software stored on any computer useable medium. Such software, when executed in one or more data processing devices, causes data processing device(s) to operate as described herein Implementations of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more implementations described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method of discovering user-behavior, the method comprising:
   collecting raw data;
   representing the raw data as trajectory data;
   segmenting the trajectory data based upon a sliding time window;
   deriving a convex hull polygon based upon the segmented data;
   determining geometric properties of the derived convex hull polygon; and
   generating a user-behavior analysis, in response to the determined geometric properties.

2. The method according to claim 1, wherein the collecting the raw data comprises storing locational data points from at least one user or object.

3. The method according to claim 1, wherein the representing comprises connecting a trajectory line between locational data points of the raw data, the trajectory line follows a time sequence of each locational data point.

4. The method according to claim 1, wherein the segmenting clusters the trajectory data into different segments corresponding to each time window in the sliding time window.

5. The method according to claim 4, wherein the sliding time window has a variable window size "$\tau$".

6. The method according to claim 1, wherein the derived convex hull polygon is derived using a convex hull algorithm in combination with the sliding time window.

7. The method according to claim 1, wherein the geometric properties define an active area, number of edges, edges length or deviation, and vertices of the derived convex hull polygon.

8. The method according to claim 7, wherein the active area indicates a user to be travelling or staying at a particular location within the sliding time window.

9. The method according to claim 1, wherein the determining geometric properties is based upon a series of derived convex hull polygons at different sliding time windows.

10. One or more non-transitory computer-readable media storing processor-executable instructions that when executed cause one or more processors to perform operations that implement a Trajectory-as-Polygon (TaP) algorithm to discover a user-behavior comprising:
    collecting locational data points;
    representing the locational data as trajectory data;
    segmenting the trajectory data based upon a sliding time window;
    deriving a polygon based upon the segmented data;
    determining geometric properties of the derived polygon; and
    generating a user-behavior analysis, in response to the determined geometric properties.

11. The one or more computer-readable media according to claim 10, wherein the locational data points are from at least one user or object, and are defined in spatial-time domain.

12. The one or more computer-readable media according to claim 10, wherein the representing comprises connecting a trajectory line between the locational data points, the trajectory line follows a time sequence of each locational data point.

13. The one or more computer-readable media according to claim 10, wherein the segmenting clusters the trajectory data into different segments corresponding to each time window in the sliding time window.

14. The one or more computer-readable media according to claim 13, wherein the sliding time window has a variable window size "$\tau$".

15. The one or more computer-readable media according to claim 10, wherein the derived polygon is a convex hull polygon.

16. The one or more computer-readable media according to claim 15, wherein the deriving is implemented through a convex hull algorithm in combination with the sliding time window.

17. The one or more computer-readable media according to claim 10, wherein the geometric properties define an active area, number of edges, edges length or deviation, and vertices of the derived convex hull polygon.

18. A system that implements a Trajectory-as-Polygon (TaP) algorithm to discover a user-behavior, the system comprising:
  a signal collecting system that collects raw data; and
  a processor coupled to the signal collecting system, the processor is configured to perform a method comprising:
    representing the raw data as trajectory data,
    segmenting the trajectory data based upon a sliding time window,
    deriving a convex hull polygon based upon the segmented data,
    determining geometric properties of the derived convex hull polygon, and
    generating a user-behavior analysis, in response to the determined geometric properties.

19. The system according to claim 18, wherein the segmenting clusters the trajectory data into different segments corresponding to each time window in the sliding time window.

20. The system according to claim 18, wherein the deriving is implemented through a convex hull algorithm in combination with the sliding time window.

* * * * *